(12) United States Patent
Fultz

(10) Patent No.: US 10,480,776 B1
(45) Date of Patent: Nov. 19, 2019

(54) FLASHLIGHT AND CAMERA ASSEMBLY FOR USE UNDER WATER

(71) Applicant: Charles Fultz, Fort Lauderdale, FL (US)

(72) Inventor: Charles Fultz, Fort Lauderdale, FL (US)

( * ) Notice: Subject to any disclaimer, the term of this patent is extended or adjusted under 35 U.S.C. 154(b) by 0 days.

(21) Appl. No.: 16/146,417

(22) Filed: Sep. 28, 2018

(51) Int. Cl.
| | |
|---|---|
| *G03B 15/02* | (2006.01) |
| *F21V 33/00* | (2006.01) |
| *H04N 5/225* | (2006.01) |
| *F21V 31/00* | (2006.01) |
| *F21L 4/02* | (2006.01) |

(52) U.S. Cl.
CPC .......... *F21V 33/0052* (2013.01); *F21L 4/022* (2013.01); *F21V 31/005* (2013.01); *H04N 5/2252* (2013.01); *H04N 5/2256* (2013.01); *H04N 5/2257* (2013.01)

(58) Field of Classification Search
CPC ........ F21L 4/00–085; F21V 31/00–005; F21V 33/0052; H04N 5/225–2258
USPC ............... 362/8–9, 11, 16–18, 202–206, 253
See application file for complete search history.

(56) References Cited

U.S. PATENT DOCUMENTS 6,877,878 B2 * 4/2005 Raskas ................. H04N 5/2256
348/E5.029

\* cited by examiner

*Primary Examiner* — Jason M Han

(57) ABSTRACT

The flashlight and camera assembly for preventing unwanted light from negatively affecting a content capturing device. An outer housing assembly houses a first light emitting device, a second light emitting device and a content capturing device. A circumference is defined by a forward-end surface. The first light emitting device is housed by a first inner housing assembly. The second light emitting device is housed by a second inner housing assembly. The content capturing device housed by a third inner housing assembly. Unwanted light is prevented from negatively affecting the content capturing device by a separate arrangement within the circumference of a first transparent covering in front of the first inner housing assembly, second transparent covering in front of the second inner housing assembly and third transparent covering in front of the third inner housing assembly.

18 Claims, 10 Drawing Sheets

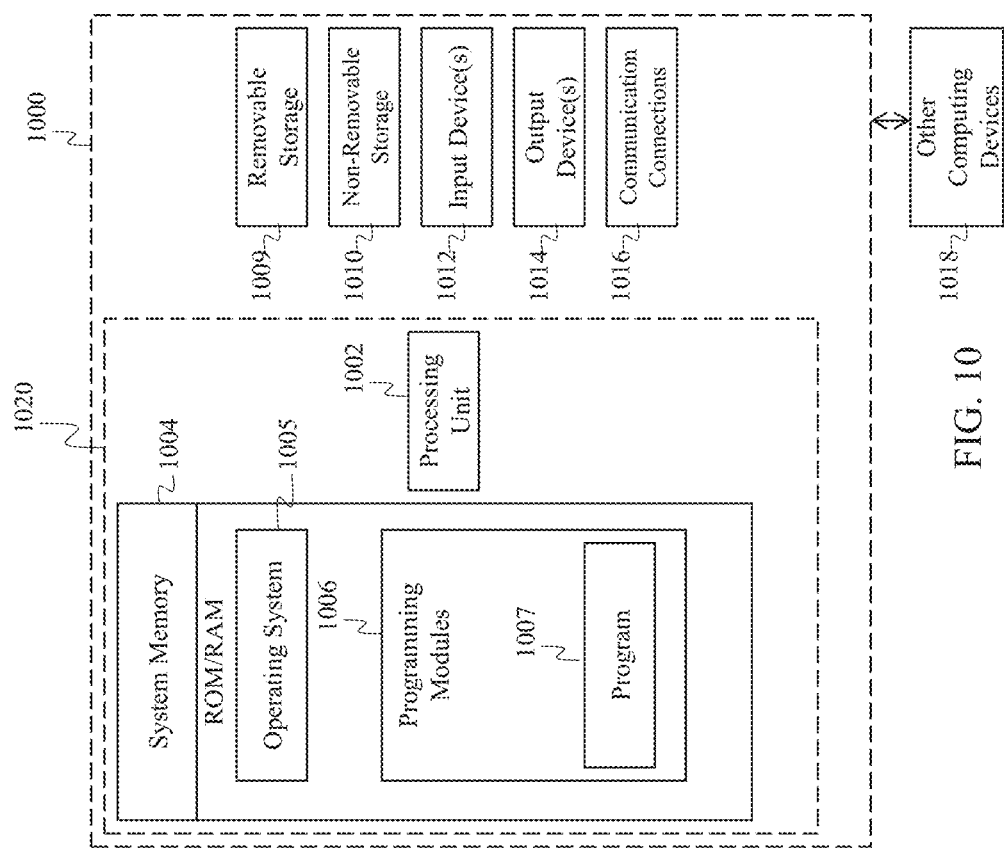

FLASHLIGHT AND CAMERA ASSEMBLY FOR USE UNDER WATER

CROSS-REFERENCE TO RELATED APPLICATIONS

This application claims the benefit of the filing date of U.S. Provisional Patent Application Ser. No. 62/726,640 titled "FLASHLIGHT ASSEMBLY FOR USE UNDER WATER", filed Sep. 4, 2018 and which the subject matter is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of flashlights for use under water, and more specifically for flashlights for use with content capturing devices such as cameras and video recording devices.

BACKGROUND

Flashlights are useful devices employed by various people and professions, such as police, firemen, military, and even maintenance workers. Flashlights are useful for illuminating dark or darkened areas or environments. Additionally, waterproofed or sealed flash lights have also become very useful in underwater environments. While flashlights have been proven to be useful devices, there are some applications where flashlights combined with a device to record or capture an image would make the flashlight even more useful. For example, a person may use a flashlight in combination with a content capturing device, such as a camera or video camera, in order to illuminate a subject before capturing content. Flashlights combined with cameras and content capturing devises have previously been known. However, such devices require that the light from the flashlight be turned off when the content or subject is captured in order to reduce washout of the photograph. Prior art has attempted to resolve these issues. For example, U.S. Pat. No. 6,877,878 to Raskas ("Raskas") teaches using a lens guide or shield to eliminate washout. However, the device taught by Raskas has many disadvantages, especially when used under water.

First, lens cover taught by the Raskas does not fully eliminate the washout caused by light emitted from the illumination light source because light still interferes with the content capturing device or camera because of light leakage between the lens plate and the lens guide taught by Raskas. Additionally, the device disclosed by Raskas cannot be used under water. The lens guide of Raskas protruding through and above the lens cover of Raskas makes the device taught by Raskas not operational for under water purposes as water would leak into the housing through small openings between the lens cover and the lens guide, especially deep under water when exposed to high pressure forces. The protruding nature of the lens guide makes the device taught by Raskas not operational or functional for under water purposes.

Other cameras and content capturing devices using light emitting devices are taught by the prior art, but there are several disadvantages to those embodiments as well. For example, many cameras have light emitting devices that provide a beam not aligned with the field of view of the camera. This is a problem for divers who want to use the light emitting devices as a flashlight to illuminate an area. For example, many cameras have lights or illuminating devices that have a beam or pattern that is not substantially aligned with the field of view of the camera A user cannot properly operate, with one hand, the camera as both a flashlight and a camera or content capturing device because a user cannot, using one hand, illuminate an area and also capture content coming from that same area without having to awkwardly manipulate the prior art devices, which can be very difficult when wearing scuba diving gear. As a result, a user constantly maneuvers these types of devices to properly aim the beam for use as a flashlight. As a result, there exists a need for improvements over the prior art and more particularly for a better flashlight for use under water.

SUMMARY

A flashlight and camera assembly for use under water is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a flashlight and camera assembly for underwater use is disclosed. The flashlight and camera assembly for use under water includes an outer housing assembly having a front end and an opposing rear end. The outer housing assembly is configured for housing a battery power source, a first light emitting device, a second light emitting device, a content capturing device and electrical circuitry for controlling said battery power source and said devices. The flashlight and camera assembly prevents unwanted light from negatively affecting the content capturing device. A forward-end surface is at the front end of the outer housing assembly. A circumference is defined by the forward-end surface. The first light emitting device is housed by a first inner housing assembly and positioned within the circumference and configured such that light is emitted from the first light emitting device in front of the outer housing assembly. A first transparent covering is positioned in front of the first inner housing assembly. The second light emitting device is housed by a second inner housing assembly and positioned within the circumference and configured such that light is emitted from the second light emitting device in front of the outer housing assembly. A second transparent covering is positioned in front of the second inner housing assembly. The content capturing device is housed by a third inner housing assembly and positioned within the circumference and configured such that content is captured by the content capturing device. A third transparent covering is positioned in front of the third inner housing assembly. Unwanted light is prevented from negatively affecting the content capturing device by a separate arrangement within the circumference of the first transparent covering in front of the first inner housing assembly, second transparent covering in front of the second inner housing assembly and third transparent covering in front of the third inner housing assembly.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
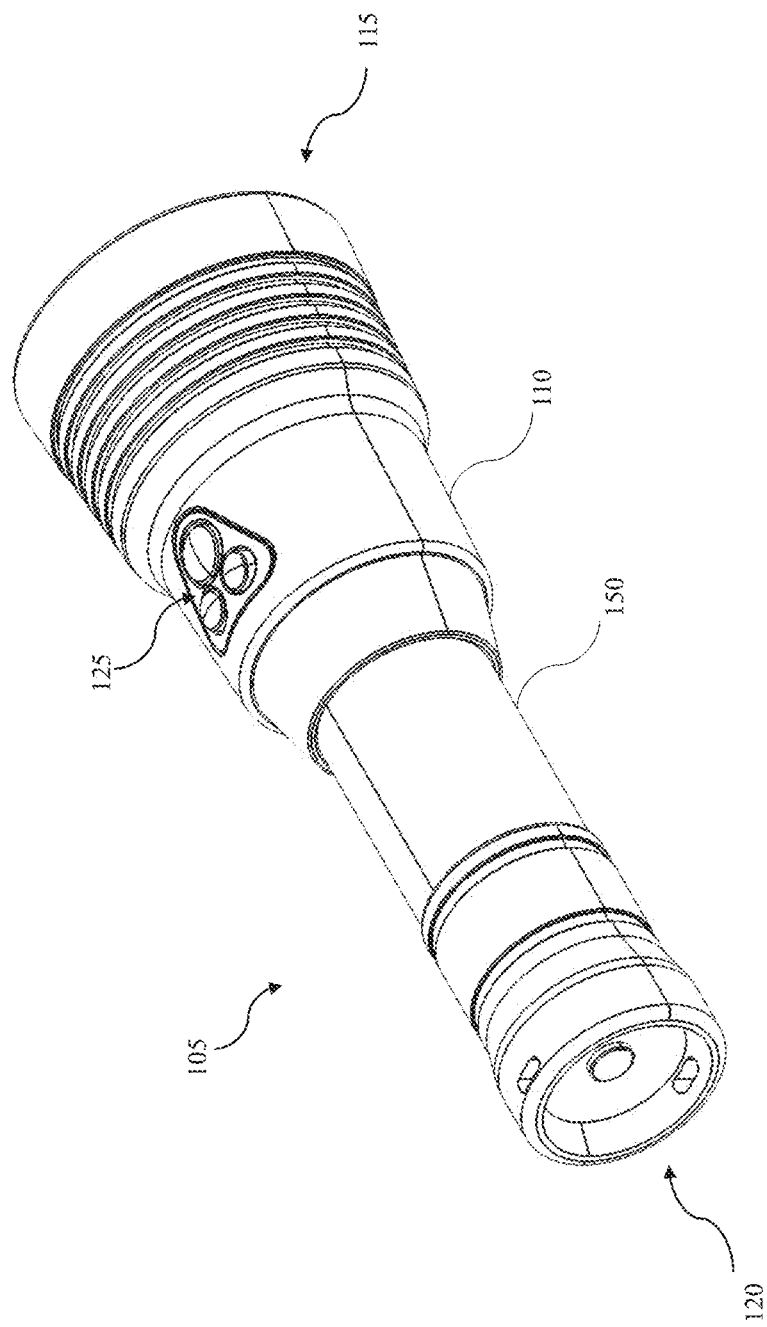
FIG. 1 is a rear perspective view of a flashlight and camera assembly for use under water, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a flashlight and camera assembly that prevents unwanted light from negatively affecting the content capturing device. One of the improvements over the prior art is that the present invention provides light emitting devices and content capturing devices housed within separate inner housing assemblies within an outer housing. Additionally, each of the light emitting devices and content capturing devices includes a transparent covering at the forward end of each of the separate inner housing assemblies. The separate arrangement of the inner housing assemblies and transparent coverings prevents light from refracting off an entire lens and into the content capturing device causing washout of a recorded or captured image. Additionally, the present invention also improves over the prior art by not having a protruding member above the forward-end surface, or any of the transparent coverings which greatly decreases the likelihood of water leaking into the outer housing. Additionally, the present invention improves over the prior art by providing a lighted area caused by a beam pattern of a light emitting device that is substantially aligned with the field of view of the content capturing device. In one embodiment, the present invention improves also over the prior art by allowing a user to operate with only one hand a flashlight having multiple light emitting devices or flashlights and content capturing devices. Additionally, the present invention also improves of the prior art by having recesses in front of the individual transparent coverings such that further light leakage into the content capturing device and washout associated with a captured image is prevented.

Figure 2:
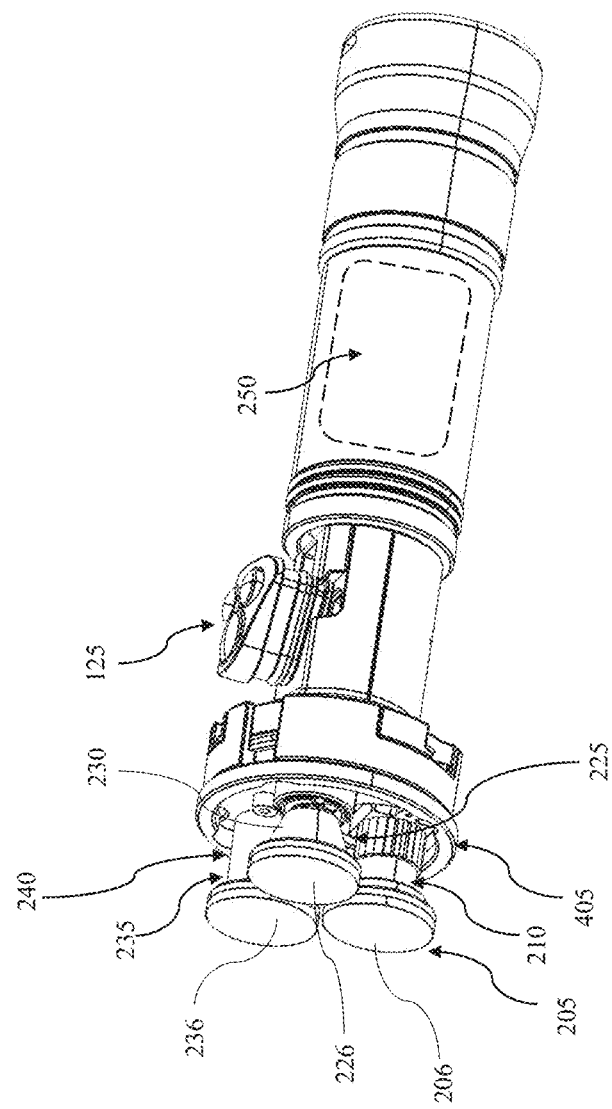
FIG. 2 is a side view of the flashlight and camera assembly for use under water, wherein a portion of an outer housing assembly has been removed illustrating a first inner housing, a second inner housing assembly and a third inner housing assembly, according to an example embodiment.

Referring now to the Figures, FIGS. 1-7 will be discussed together. Individual figures will be referred through to further assist the reader. The present invention is a flashlight and camera assembly 105 for use under water. The flashlight and camera assembly has an outer housing assembly 110 having a front end 115 and an opposing rear end 120. The outer housing assembly is configured for housing a battery power source, a first light emitting device 225, a second light emitting device 235, a content capturing device 205 (as illustrated in FIG. 2) and electrical circuitry for controlling said battery power source and said devices.

The outer housing assembly defines an elongated shaped body. The outer housing assembly when fully assembled or enclosed, prevents water from entering into the housing and is intended to be used when under water having under water pressure acting on the outer housing. The outer housing assembly may defined by a single component or may be multiple components assembled and providing water proof type properties. The outer housing assembly may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, other materials having water proof type properties. The component(s) of the outer housing assembly may be manufactured from a variety of different processes including via a CNC lathe, extrusion, a mold, welding, shearing, punching welding, folding etc.

Unwanted light is prevented from negatively affecting the content capturing device because of the separate arrangement of the light emitting devices and content capturing devices. A forward-end surface 302 is at the front end of the outer housing assembly. The forward-end surface is a substantially planar shaped body having openings for allowing to light to pass though the openings (which such transparent openings are configured such that the transparent coverings allow light to pass through the transparent openings and the openings on the forward-end surface). The forward end surface prevents water from entering into the housing and is intended to be used when under water having under water pressure acting on the outer housing. The forward end-surface may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, other materials having water proof type properties. It is understood that other types of materials may also be used and are within the spirit and scope of the present invention. The component(s) of the outer housing assembly may be manufactured from a variety of different processes including via a CNC lathe, extrusion, a mold, welding, shearing, punching welding, folding etc.

A circumference 405 is defined by the perimeter of the forward-end surface. The light emitting devices and content capturing devices are positioned below or reward from the forard-end surface. The light emitting devices being below the forward-end surface greatly decreases the probability of water leakage into the outer housing. Additionally, the present invention does not include any protrusions through thought the transparent coverings (further explained below) that would affect the ability of the outer housing assembly to keep water outside of the other housing assembly.

Referring to FIG. 2, within the outer housing assembly, the first light emitting device is housed by a first inner housing assembly 230 (as illustrated in FIG. 2) and positioned within the circumference 405 and is configured or arranged such that light is emitted from the first light emitting device in front of the outer housing assembly 110. The first light emitting device may be a any type of apparatus that is configured for emitting light and may include incandescent bulbs, halogen lights, fluorescent tubes, compact fluorescents, high intensity discharge lights, led light bulbs, LED panels, globe LED bulbs, diodes, or any combination of a device that is configured for emitting light. It is understood that other types of bulbs and light emitting devices may also be used and are within the spirit and scope of the present invention.

The first inner housing assembly is separate from the second inner housing assembly and third inner housing assembles. The first inner housing assembly include a single component or multiple components assembled together. The first inner housing assembly when fully assembled or enclosed, prevents light from affecting the content capturing device (further explained below). The first inner housing assembly may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, other materials having water proof type properties. The component(s) of the outer housing assembly may be manufactured from a variety of different processes including via a CNC lathe, extrusion, a mold, welding, shearing, punching welding, folding etc. However, it is understood that other materials and processes for the first inner housing may be used that are within the spirit and scope of the present invention.

A first transparent covering 226 is positioned in front of the first inner housing assembly. The first transparent covering is configured for allowing light to pass through and is capable of under water pressure. The first transparent covering may be formed from many materials and/or combination of materials including plastic and glass. In one embodiment, the first transparent may be made from a polycarbonate material. It is understood that other types of material for the first transparent covering may also be used and are within the spirit and scope of the present invention.

The second light emitting device 235 is housed by a second inner housing assembly 240 and positioned within the circumference 405 and configured such that light is emitted from the second light emitting device in front of the outer housing assembly. The second light emitting device 235 may be any type of apparatus that is configured for emitting light and may include incandescent bulbs, halogen lights, fluorescent tubes, compact fluorescents, high intensity discharge lights, led light bulbs, LED panels, globe LED bulbs, diodes, or any combination of a device that is configured for emitting light. It is understood that other types of bulbs and light emitting devices may also be used and are within the spirit and scope of the present invention. The second light emitting device is configured for emitting a beam pattern that is different from the beam pattern emitted from the first light emitting device (further explained below).

A second transparent covering is positioned in front of the second inner housing assembly. The second transparent covering is configured for allowing light to pass through and is capable of under water pressure. The second transparent covering may be formed from many materials and/or combination of materials including plastic and glass. In one embodiment, the second transparent may be made from a polycarbonate material. It is understood that other types of material for the first transparent covering may also be used and are within the spirit and scope of the present invention.

The content capturing device 205 is housed by a third inner housing assembly 210 and positioned within the circumference 405 and configured such that content is captured by the content capturing device. The content capturing device may be a camera configured for capturing still images, moving images, audio and combination thereof. The content capturing device may include a digital camera, SSLR camera, mirrorless camera, instant camera, bridge camera, point-and-shot camera, audio/video recording camera. It is understood that other types of content capturing devices configured for capturing images, video and audio may also be used and are within the spirit and scope of the present invention.

As mentioned above, the third inner housing assembly is separate from the first inner housing assembly and second inner housing assembles. The third inner housing assembly include a single component or multiple components assembled together. The third inner housing assembly when fully assembled or enclosed and separate from the first inner housing and second inner housing prevents light from affecting the content capturing device (further explained below). The third inner housing assembly may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™ and Makrolon™, other materials having water proof type properties. The component(s) of the third inner housing assembly may be manufactured from a variety of different processes including via a CNC lathe, extrusion, a mold, welding, shearing, punching welding, folding etc. However, it is understood that other materials and processes for the third inner housing may be used that are within the spirit and scope of the present invention.

A third transparent covering 206 is positioned in front of the third inner housing assembly. The third transparent covering is positioned in front of the third inner housing assembly. The third transparent covering is configured for allowing light to pass through and is capable of under water pressure. The third transparent covering may be formed from many materials and/or combination of materials including plastic and glass. In one embodiment, the third transparent may be made from a polycarbonate material. It is understood that other types of material for the third transparent covering may also be used and are within the spirit and scope of the present invention.

It is important that the light emitting devices and content capturing device be positioned below or rear from the forward-end surface and not above the forward-end surface to prevent water leakage. Allowing protruding features to protrude the transparent covering greatly increases the likelihood of water leaking into the outer housing assembly and causing damage. The third inner housing assembly is separate from the second inner housing assembly and first inner housing assembles. Also, it is important that no protruding objects extend though either the first transparent covering, the second transparent covering or the third transparent covering.

Unwanted light is prevented from negatively affecting the content capturing device by a separate arrangement within the circumference, of the first transparent covering in front of the first inner housing assembly, second transparent covering in front of the second inner housing assembly and third transparent covering in front of the third inner housing assembly. As illustrated in the figures, the separate arrangement is such that light emitted from either the first light emitting device and second light emitting device do not spill or leak into the content capturing device. The separate arrangement is defined as having inner housings or individually inner housing assemblies for each of the light emitting devices and content capturing devices. Additionally, the separate arrangement is defined as having transparent coverings creating a seal over each of the light emitting devices and content capturing devices. The prior art discloses transparent coverings that over both the light emitting device and the content capturing devices, which causes light to spill or affect the images captured by the content capturing devices and may cause washout.

Figure 3:
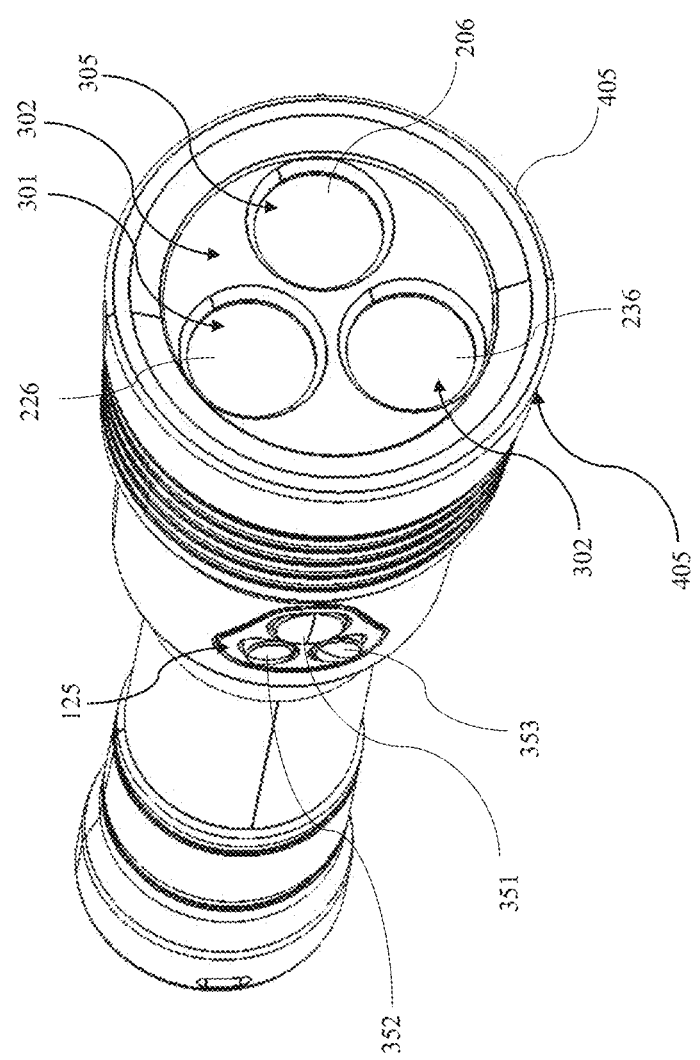
FIG. 3 is a front perspective view of the flashlight and camera assembly for use under water, according to an example embodiment.
Figure 4:
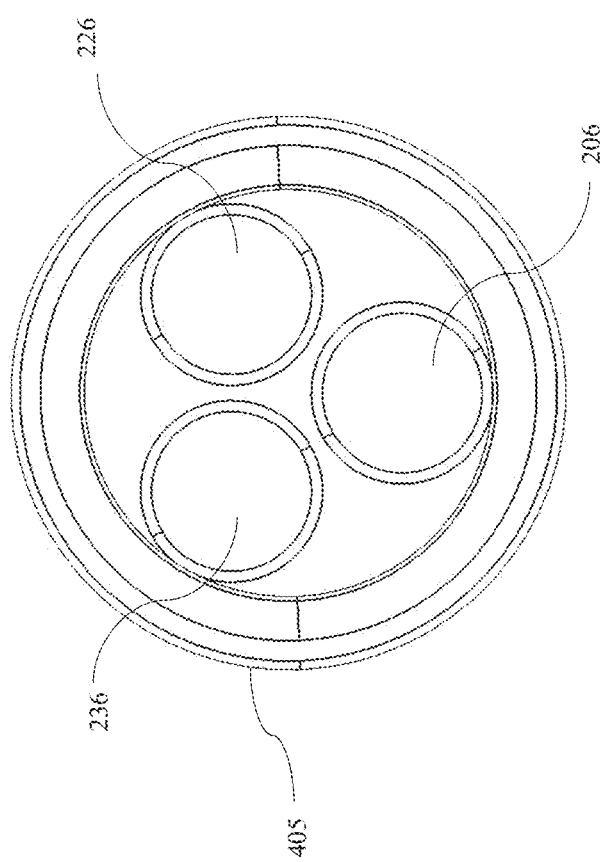
FIG. 4 is a front view of the flashlight and camera assembly for use under water, according to an example embodiment.

As best illustrated in FIG. 3, the flashlight and camera assembly also includes recesses above the individual transparent coverings of the first light emitting device, second light emitting device and content capturing devices such that that the transparent coverings are positioned rearward or below the forward-end surface. The recesses include a first recess 301 within the circumference 405 and in front of the first transparent covering 226, a second recess 302 within the circumference and in front of the second transparent covering 236 and a third recess 206 within the circumference and in front of the third transparent covering. The recesses combined with the inner housing assemblies further prevent light leakage or light affecting the content captured by the content capturing devices. Also FIG. 3 also illustrates that there are no protruding features through any of the first, second or third transparent coverings.

The flashlight and camera assembly further includes a plurality of controls 125 on an outward facing surface of the outer housing 110. In the present embodiment, the controls include outward facings buttons 351, 352, 353 that may actuated or controlled by the user. The buttons are in electrical communication with the processor and electrical circuitry within the outer housing configured for controlling the first light emitting device, second light emitting device and content capturing device. A handgrip 150 is defined by a rearward portion of the outward facing surface of the outer housing assembly. The handgrip allows a user to easily grab and hold the flashlight and camera assembly. The controls for controlling first light emitting device, second light emitting device and content capturing device are configured such that a user may operate the controls using one hand of a user. FIG. 3 illustrates that in one embodiment, the controls may include a first button 351, a second button 352 and third button 353. The buttons may be configured for controlling the first light emitting device, second light emitting device and content capturing devices by simply pushing the buttons with a single finger.

For example, in one embodiment, in order to operate the first light emitting device, an operator may only have to press the first button 351 only one time for activating the first light emitting device such that it emits a wide beam pattern in order to capture content efficiently. In one embodiment, the processor, devices and electrical circuitry are configured such that if the first button 351 is pressed two times, then the device is configured for providing light in the second beam pattern or narrow beam pattern from the second light emitting device. Additionally, the processor, devices and electrical circuitry are configured such that if the first button is pressed three times, a strobe light is emitted. Additionally, in one non-limiting embodiment, the processor, devices and electrical circuitry are configured such that if the second button 352 is held for two seconds by a single finger, then the camera may be activated for capturing content. It is understood that numerous variations of controlling the first light emitting device, second light emitting device and content capturing device may be programmed into the processor (further explained below) such that inputs received via button 351, button 352, and button 353 control the device. Also, with noting is that a user may easily control numerous functions simply by pushing one or more of the buttons 351, 352, 353 using a single finger.

A cavity 250 (as illustrated in 2) within the rearward portion of the outer housing assembly is configured for receiving the battery source. The battery power source may be removable. In the present embodiment, the battery power source may be a battery power source, such as a standard dry cell battery commonly used in low-drain portable electronic devices (i.e., AAA batteries, AA batteries, etc.). Other types of batteries may be used including rechargeable batteries, aluminum air batteries, lithium batteries, paper batteries, lithium-ion polymer batteries, lithium iron phosphate batteries, magnesium iron batteries etc. Additionally, other types of battery applications may be used and are within the spirit and scope of the present invention. For example, a battery stripper pack may also be used. Additionally, other types of power sources ma) also be used and are within the spirit and scope of the present invention.

The outer housing is also configured for housing a processor that controls the first light emitting device, the first light emitting device and content capturing devices (further explained below).

Figure 5:
FIG. 5 is a side view of the flashlight and camera assembly for use under water, illustrating a second beam pattern of the second light emitting device, according to an example embodiment.

Referring to FIG. 5 one of the light emitting devices is configured for emitting light having a beam pattern 505 (defined by the cone shape) that is configured for a user to use when the user desires to have a light for primary use or for assisting the user to see darkened areas. The term beam pattern means the somewhat cone shape beam of light that is produced from a light emitting device. The term pattern origin means the location form where the cone of the beam pattern originates. The term beam angle means the angle which the light is distributed or emitted from the source of light emitting device. In one embodiment, the beam pattern 505 has a beam angle 515 of approximately 10-15 degrees. However, it is understood that other angles for assisting divers or user to see darkened areas under water may be used and are within the spirit and scope of the present invention. The beam pattern 505 also is configured for having a pattern origin 520 that originates within the circumference 405. As mentioned above, a user may simply activate the beam pattern by using one of the buttons 351, 352 353 protruding from the outward facing housing.

Figure 6:
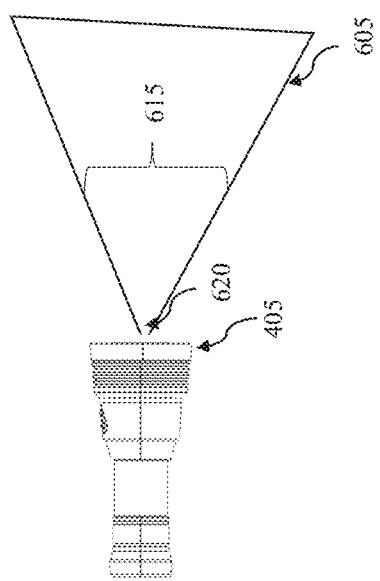
FIG. 6 is a side view of the flashlight and camera assembly for use under water, illustrating a first beam pattern of the first light emitting device, according to an example embodiment.

Referring to FIG. 6, one of the light emitting devices is configured for emitting light having a beam pattern 605 that is configured for a user to use when the user desires to have a light for use with the content capturing devices in darkened areas. In many cases, the light required for properly photographing and recording subjects uses a different beam pattern than is useful for the assisting divers to see in darkened areas. Typically, the beam pattern needed for capturing content (photographing and recording subjects) has a wider beam angle than the beam pattern used for lighting darkened areas. Additionally, the beam pattern used for capturing content may not be useful for viewing long distances from the content capture origin and visa versa, especially under water. In one embodiment, the beam pattern 605 has a beam angle 615 of approximately 100-120 degrees. However, in other embodiments, other beam angles may be used. The beam pattern 605 is also configured for having a pattern origin 620 that originates within the circumference 405.

Figure 7:
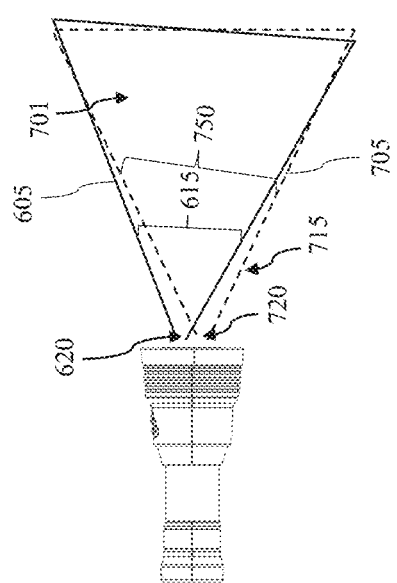
FIG. 7 is a side view of the flashlight and camera assembly for use under water, illustrating that a lighted area caused by the first beam pattern is substantially aligned with a field of view of the content capturing device, according to an example embodiment.

Referring to FIG. 7, a lighted area 701 caused by the beam pattern 605 from the first light emitting device is substantially aligned with the field of view 705 of the content capturing device. The field of view of the content capturing device is the area in front of the content capturing device that may be captured as content by the content capturing device. The angle of the field of view means the angular extent of a given scene that is captured by a camera or content capturing device. The content capture origin means the location or origin of where the camera or content capturing device captures content.

As illustrated in FIG. 7, the angle 750 of the field of view 705 of the content capturing device is substantially the same as or aligned with the beam pattern 605 of the first light emitting device. Additionally, a content capture origin 720 of the content capturing device and pattern origin 620 of the light emitting device are within the circumference. As a result, the lighted area caused by the first beam pattern is substantially aligned with or the same as the field of view of the content capturing device. This makes it very easy for a diver or user because a diver may simply point or direct the beam pattern 605 in the same direction that he or she wants to capture content, which is unlike much of the prior art. Having the lighted area caused by the first beam pattern substantially aligned with the field of view (as illustrated in FIG. 7) allows a user to easily capture content using only a single finger.

In operation a diver may be using the light emitting device emitting beam pattern 505 and spot a subject far away from the content capturing device that the diver wants to capture using the content capturing device. The diver can easily keep the beam pattern 505 aimed on the subject as the diver approaches to the subject, then when the diver is within an appropriate range, the diver may—without having to stop aiming the flashlight and camera assembly at the subject— actuate the controls using the same hand that the diver is gripping the flashlight and camera assembly to activate the content capturing device and beam of light 705 so that the appropriate light for the content capturing device is provided in order to photograph or record the subject. Next, after the user has photographed or recorded the subject, the user— without having to stop aiming the flashlight and camera assembly—may actuate the controls using the same hand that the diver is gripping the flashlight and camera assembly to deactivate beam pattern 705 and content capturing device and reactivate beam pattern 605.

Figure 8:
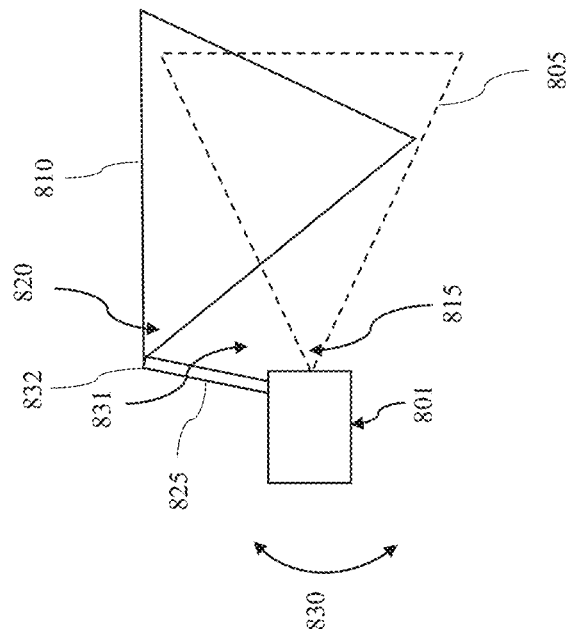
FIG. 8 is a top view of the main components of a prior art content capturing device and light emitting device, illustrating that a lighted area caused by light emitting device is not substantially aligned with a field of view of the content capturing device, according to an example embodiment.

One embodiment of a prior art device is illustrated in FIG. 8. FIG. 8 illustrates the content capturing device 801 having a content capture origin 815 not proximate and within the same circumference as the pattern origin 820 of the beam pattern 810 of the light emitting device 832. As a result, much of the beam pattern 810 of the light emitting device of the prior art and the field of view 805 of the content capturing device of the prior art are not aligned. As a result, it makes it very difficult for a diver or user, especially when scuba diving because the diver will have to manipulate much of the beam pattern 810 of the light emitting device of the prior art by rotating the device (in the directions of line 830) so that the diver can see area 831. On the other hand, because the applicant's invention has a field of view 705 and beam pattern 605 (as illustrated in FIG. 7) that are substantially aligned, a user can easily capture content where the diver is aiming and looking. Unlike the Applicant's invention, the prior art as illustrated in FIG. 8 fails to address the fact a user will need a beam pattern that is appropriate for capturing content and another beam pattern for viewing objects from a distance. As a result, the prior art, unlike the applicant's invention, will need to have two separate devices, one for providing light for viewing objects from a distance and a second device for providing light for appropriately capturing content. Additionally (as explained above), using the Applicant's invention, a diver can easily switch between beam patterns to both view subjects from a distance and capture the subject at close range by using only one hand, will not have to lose sight of the subject given that a diver will not have to stop aiming a beam pattern at the subject and will be able to capture content without having wash out.

Figure 9:
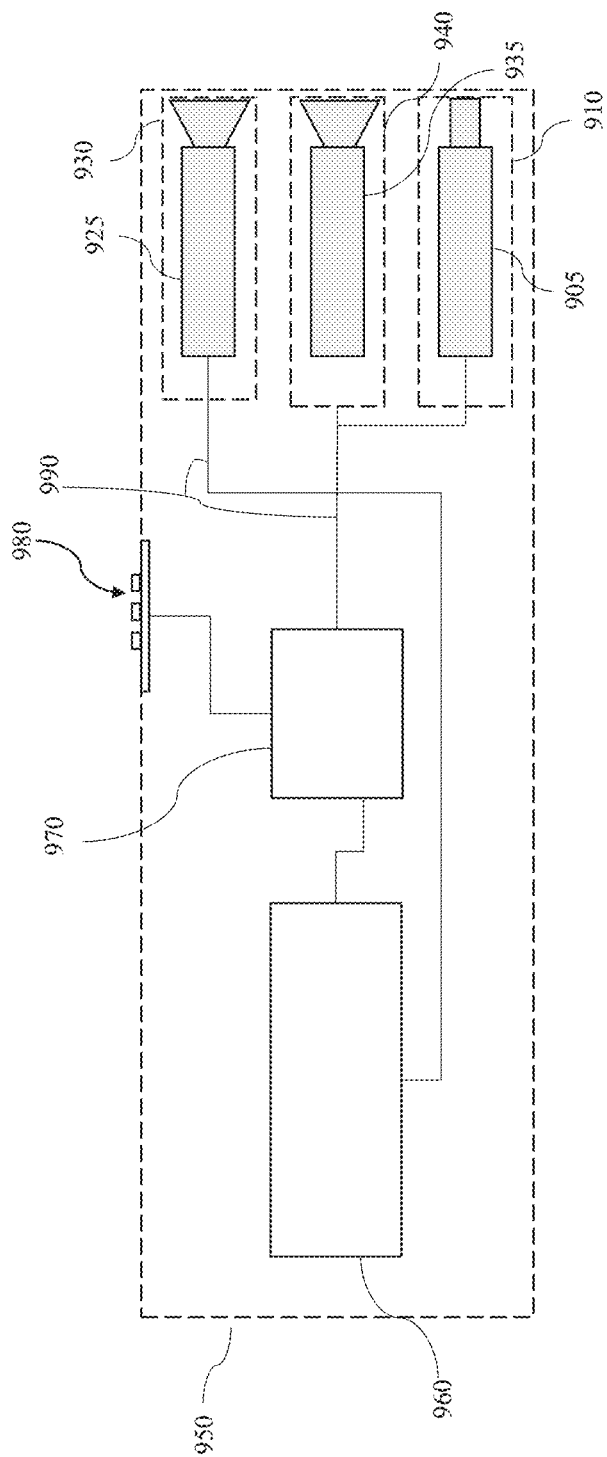
FIG. 9 is a block diagram illustration of main electrical components of the flashlight and camera assembly with the device, according to an example embodiment; and, FIG. 10 is a block diagram illustration of main components of a processor that may be included along with the device, according to an example embodiment.

FIG. 9 is a block diagram illustration of main electrical components of the flashlight and camera assembly with the device, according to an example embodiment. It is understood that FIG. 9 illustrates only the main components that are meant to illustrate all electrical components of the present invention. FIG. 9 illustrates that the outer housing assembly 950 enclosing the electrical components. The first inner housing assembly 930 is separate from the second inner housing assembly 940 and third inner housing assembly 910. As mentioned above, one of the important features of the invention is the separate inter-housing assemblies that prevents a light leakage and washout. Additionally, as mentioned above, nothing protrudes in front of forward end surface which allows the flashlight and camera assembly to maintain its watertight and waterproof property such that the flashlight and camera assembly may be used underwater. The first light emitting device 925 is housed within the first inner housing assembly 930. The second light emitting device 935 is housed within the second inner housing assembly 940. The third light emitting device 905 is housed within the third inner housing assembly 910. Each of the first light emitting device, second light emitting device and content capturing device is in electrical communication via electrical conductors 990 with the processor 970 and battery power source 960. Controls 980 are also in electrical communication with the processor and other components of the flashlight and camera assembly and are configured for controlling the battery power sources, first light emitting device, second light emitting device and the content capturing devices.

Referring to FIG. 10, an embodiment of the invention may include a plurality of processors or microprocessors, such as processor 1000. In a basic configuration, computing device or processor 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination or memory. System memory 1004 may include operating system 1005, one or more programming modules 1006 (such as program module 1007). Operating system 1005, for example, may be suitable for controlling computing device 1000's operation. In one embodiment, programming modules 1006 may include, for example, a program module 1007. Furthermore, embodiments of the invention may be practiced in conjunction with a graphics library, other operating systems, or any other application program and is not limited to any particular application or system. This basic configuration is illustrated in FIG. 10 by those components within a dashed line 1020.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of processor used for the flashlight and camera assembly. Computing device 1000 may also have input device(s) 1012 such as a keyboard, a mouse, a pen, a sound input device, a camera, a touch input device, etc. Output device(s) 1014 such as a display, speakers, a printer, etc. may also be included. The aforementioned devices are only examples, and other devices may be added or substituted.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1004, including operating system 1005. Computing device 1002 may also include a graphics processing unit 1003, which supplements the processing capabilities of processor 1002 and which may execute programming modules 1006, including all or a portion of those apparatus shown in FIG. 9 above. The aforementioned processes are examples, and processing units 1002, 1003 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A flashlight and camera assembly for use under water comprising:
   an outer housing assembly having a front end and an opposing rear end, the outer housing assembly configured for housing a battery power source, a first light emitting device, a second light emitting device, a content capturing device and electrical circuitry for controlling said battery power source and said devices, wherein unwanted light is prevented from negatively affecting the content capturing device;
   a forward-end surface at the front end of the outer housing assembly;
   a circumference defined by the forward-end surface;
   the first light emitting device housed by a first inner housing assembly and positioned within the circumference and configured such that light is emitted from the first light emitting device in front of the outer housing assembly;
   a first transparent covering positioned in front of the first inner housing assembly;
   the second light emitting device housed by a second inner housing assembly and positioned within the circumference and configured such that light is emitted from the second light emitting device in front of the outer housing assembly;
   a second transparent covering positioned in front of the second inner housing assembly;
   the content capturing device housed by a third inner housing assembly and positioned within the circumference and configured such that content is captured by the content capturing device;
   a third transparent covering positioned in front of the third inner housing assembly; and,
   wherein unwanted light is prevented from negatively affecting the content capturing device by a separate arrangement within the circumference of the first transparent covering in front of the first inner housing assembly, second transparent covering in front of the second inner housing assembly and third transparent covering in front of the third inner housing assembly.

2. The flashlight and camera assembly for use under water from claim 1, wherein the assembly further includes:
   a first recess within the circumference and in front of the first transparent covering;
   a second recess within the circumference and in front of the second transparent covering; and,
   a third recess within the circumference and in front of the third transparent covering.

3. The flashlight and camera assembly for use under water from claim 1, wherein the flashlight and camera assembly further includes a plurality of controls on an outward facing surface of the outer housing configured controlling the first light emitting device, second light emitting device and content capturing device.

4. The flashlight and camera assembly for use under water from claim 1, wherein the first light emitting device is configured for emitting light having a first beam pattern.

5. The flashlight and camera assembly for use under water from claim 4, wherein the second light emitting device is configured for emitting light having a second beam pattern, wherein the first beam pattern defines a first beam angle that is greater than a second beam angle defined by the second beam pattern.

6. The flashlight and camera assembly for use under water from claim 5, wherein an angle of view of a field of view of the content capturing device is substantially the same as a first beam pattern of the first light emitting device, and a content capture origin of the content capturing device and a pattern origin of a first beam pattern of the first light emitting device are within the circumference, such that a lighted area caused by the first beam pattern is substantially aligned with the field of view of the content capturing device.

7. The flashlight and camera assembly for use under water from claim 1, wherein a handgrip is defined by a rearward portion of the outward facing surface of the outer housing assembly.

8. The flashlight and camera assembly for use under water from claim 1, wherein a cavity within the rearward portion is configured for receiving the battery source, and wherein the battery power source is removable.

9. The flashlight and camera assembly for use under water from claim 3, wherein the controls for controlling first light emitting device, second light emitting device and content capturing device are configured such that a user may operate the controls using one hand of a user.

10. A flashlight and camera assembly for use under water comprising:
    an outer housing assembly having a front end and an opposing rear end, the outer housing assembly configured for housing a battery power source, a first light emitting device, a second light emitting device, a content capturing device and electrical circuitry for controlling said battery power source and said devices, wherein unwanted light is prevented from negatively affecting the content capturing device;
    a forward-end surface at the front end of the outer housing assembly;
    a circumference defined by the forward-end surface;
    the first light emitting device housed by a first inner housing assembly and positioned within the circumference and configured such that light is emitted from the first light emitting device in front of the outer housing assembly;
    a first transparent covering positioned in front of the first inner housing assembly;
    the second light emitting device housed by a second inner housing assembly and positioned within the circumference and configured such that light is emitted from the second light emitting device in front of the outer housing assembly;
    a second transparent covering positioned in front of the second inner housing assembly;

the content capturing device housed by a third inner housing assembly and positioned within the circumference and configured such that content is captured by the content capturing device;

a third transparent covering positioned in front of the third inner housing assembly:

unwanted light is prevented from negatively affecting the content capturing device by a separate arrangement within the circumference of the first transparent covering in front of the first inner housing assembly, second transparent covering in front of the second inner housing assembly and third transparent covering in front of the third inner housing assembly;

wherein no protruding objects extend though the first transparent covering, the second transparent covering and the third transparent covering; and, wherein an angle of view of a field of view of the content capturing device is substantially the same as a first beam pattern of the first light emitting device, and a content capture origin of the content capturing device and pattern origin of a first beam pattern of the first light emitting device are within the circumference, such that a lighted area caused by the first beam pattern is substantially aligned with the field of view.

11. The flashlight and camera assembly for use under water from claim 10, wherein the assembly further includes:
a first recess within the circumference and in front of the first transparent covering;
a second recess within the circumference and in front of the second transparent covering; and,
a third recess within the circumference and in front of the third transparent covering.

12. The flashlight and camera assembly for use under water from claim 11, wherein the flashlight and camera assembly further includes a plurality of controls on an outward facing surface of the outer housing configured controlling the first light emitting device, second light emitting device and content capturing device.

13. The flashlight and camera assembly for use under water from claim 12, wherein the second light emitting device is configured for emitting light having a second beam pattern, wherein the first beam pattern defines a first beam angle that is greater than a second beam angle defined by the second beam pattern.

14. The flashlight and camera assembly for use under water from claim 13, wherein a handgrip is defined by a rearward portion of the outward facing surface of the outer housing assembly.

15. The flashlight and camera assembly for use under water from claim 14, wherein a cavity within the rearward portion is configured for receiving the battery source, and wherein the battery power source is removable.

16. The flashlight and camera assembly for use under water from claim 15, wherein the controls for controlling first light emitting device, second light emitting device and content capturing device are configured such that a user may operate the controls using one hand of a user.

17. A flashlight and camera assembly comprising:
an outer housing assembly having a front end and an opposing rear end, the outer housing assembly configured for housing a battery power source, a first light emitting device, a content capturing device and electrical circuitry for controlling said battery power source and said devices, wherein unwanted light is prevented from negatively affecting the content capturing device;
a forward-end surface at the front end of the outer housing assembly;
a circumference defined by the forward-end surface;
the first light emitting device housed by a first inner housing assembly and positioned within the circumference and configured such that light is emitted from the first light emitting device in front of the outer housing assembly;
a first transparent covering positioned in front of the first inner housing assembly;
the content capturing device housed by a second inner housing assembly and positioned within the circumference and configured such that content is captured by the content capturing device;
a second transparent covering positioned in front of the second inner housing assembly; and,
wherein unwanted light is prevented from negatively affecting the content capturing device by a separate arrangement within the circumference of the first transparent covering in front of the first inner housing assembly and the second transparent covering in front of the second inner housing assembly,
wherein an angle of view of a field of view of the content capturing device is substantially the same as a first beam pattern of the first light emitting device, and a content capture origin of the content capturing device and a pattern origin of a first beam pattern of the first light emitting device are within the circumference, such that a lighted area caused by the first beam pattern is substantially aligned with the field of view.

18. The flashlight and camera assembly from claim 17, wherein the assembly further includes:
a first recess within the circumference and in front of the first transparent covering; and,
a second recess within the circumference and in front of the second transparent covering.

* * * * *